Nov. 19, 1929.  D. E. ROBERTSON  1,736,220

CAMERA ATTACHMENT

Filed Sept. 6, 1928

Inventor
D. E. Robertson
By C. A. Snow & Co.
Attorneys.

Patented Nov. 19, 1929

1,736,220

UNITED STATES PATENT OFFICE

DOLPHUS E. ROBERTSON, OF PARAGOULD, ARKANSAS

CAMERA ATTACHMENT

Application filed September 6, 1928. Serial No. 304,294.

This invention relates to an attachment for photographic cameras, one of the objects being to provide a simple device by means of which two or more exposures can be made without shifting the film or plate, it being thereby possible to produce a multiple photograph which can be made not only interesting but also novel and amusing.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
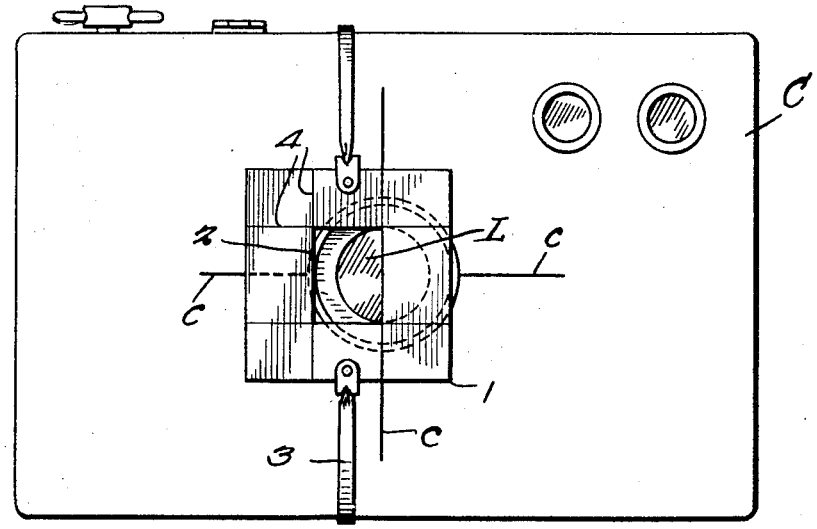
Figure 1 is a front elevation of a camera having the attachment applied thereto for a one-half exposure of a film or plate.
Figure 2:
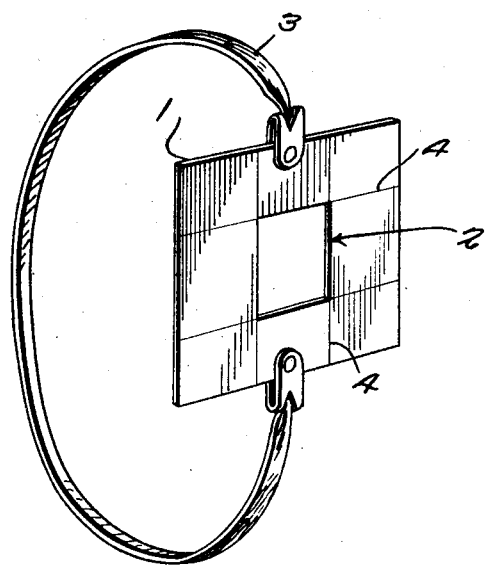
Figure 2 is a perspective view of the attachment.

Referring to the figures by characters of reference, 1 designates a thin plate of opaque material preferably rectangular and having a central rectangular opening 2. An elastic strip 3 is connected at its ends to opposed edges of the plate and formed on one face of the plate are lines 4 constituting continuations of the walls of the opening 2.

The camera C which is of the box type in the structure illustrated has a lens L set back from the front of the camera and radiating from the lens opening are indicating lines c arranged ninety degrees apart.

When it is desired to make two exposures on a plate or film without changing the same the plate 1 is positioned across the lens opening with the band 3 extending around the camera and with the vertical lines 4 registering with the vertical lines c. One half of the lens is to be exposed through the opening 2 and plate 1 must of course be adjusted vertically to insure this exposure. One exposure can then be made after which the plate 1 can be shifted to its opposite extreme position and another exposure made.

By placing the horizontal lines 4 at the top of the plate in alinement with the horizontal lines c and placing the vertical lines 4 at the right of the plate in alinement with the vertical lines c only one-quarter of the lens will be exposed and when an exposure is made the image will be recorded on one-quarter only of the film or plate. The attachment can then be shifted to expose another quarter of the film or plate when the shutter is operated. By following this procedure four different exposures can be made on one plate or film.

What is claimed is:

1. The combination with a camera having a lens opening and indicating lines radiating from the opening, of an opaque plate having an angular opening therein for exposure of a portion of the lens opening, there being lines on the plate constituting continuations of the walls of the opening, said plate being shiftable to position its lines in register with selected lines on the camera, and means for holding the plate detachably to the camera.

2. An attachment of the class described including a plate having an angular opening therein, there being lines on one face of the plate extending to the margin thereof and constituting continuations of the walls of the opening, and an elastic attaching band connected at its ends to opposed edges of the plate.

In testimony that I claim the foregoing as my own, I have hereto affixed my signature.

DOLPHUS E. ROBERTSON.